June 19, 1951　　　　R. H. MILLER　　　　2,557,675
ELECTRICAL CONTROL CIRCUIT
Filed May 12, 1947　　　　　　　　　　　　　　2 Sheets-Sheet 2
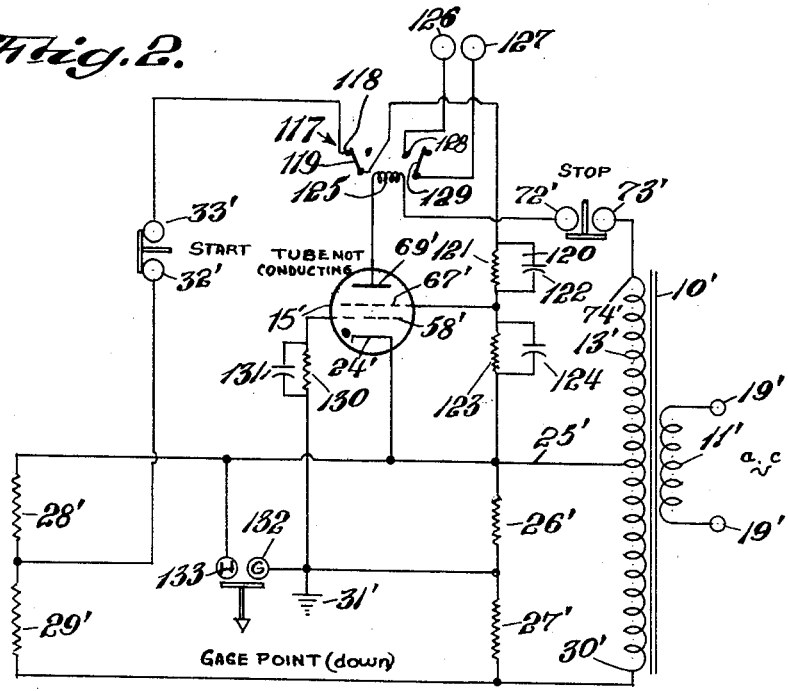
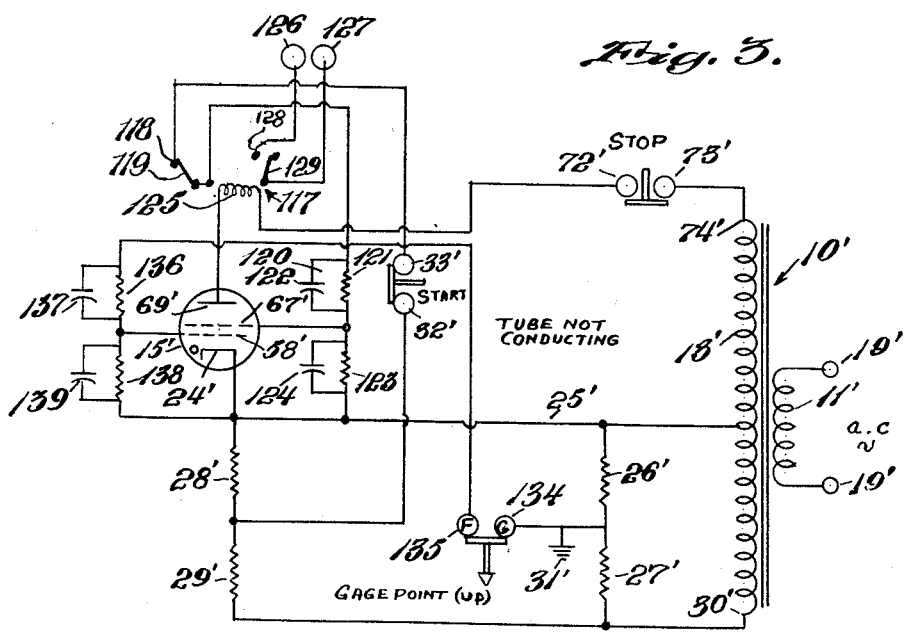
INVENTOR.
Raymond H. Miller
BY
Barlow & Barlow
ATTORNEYS.

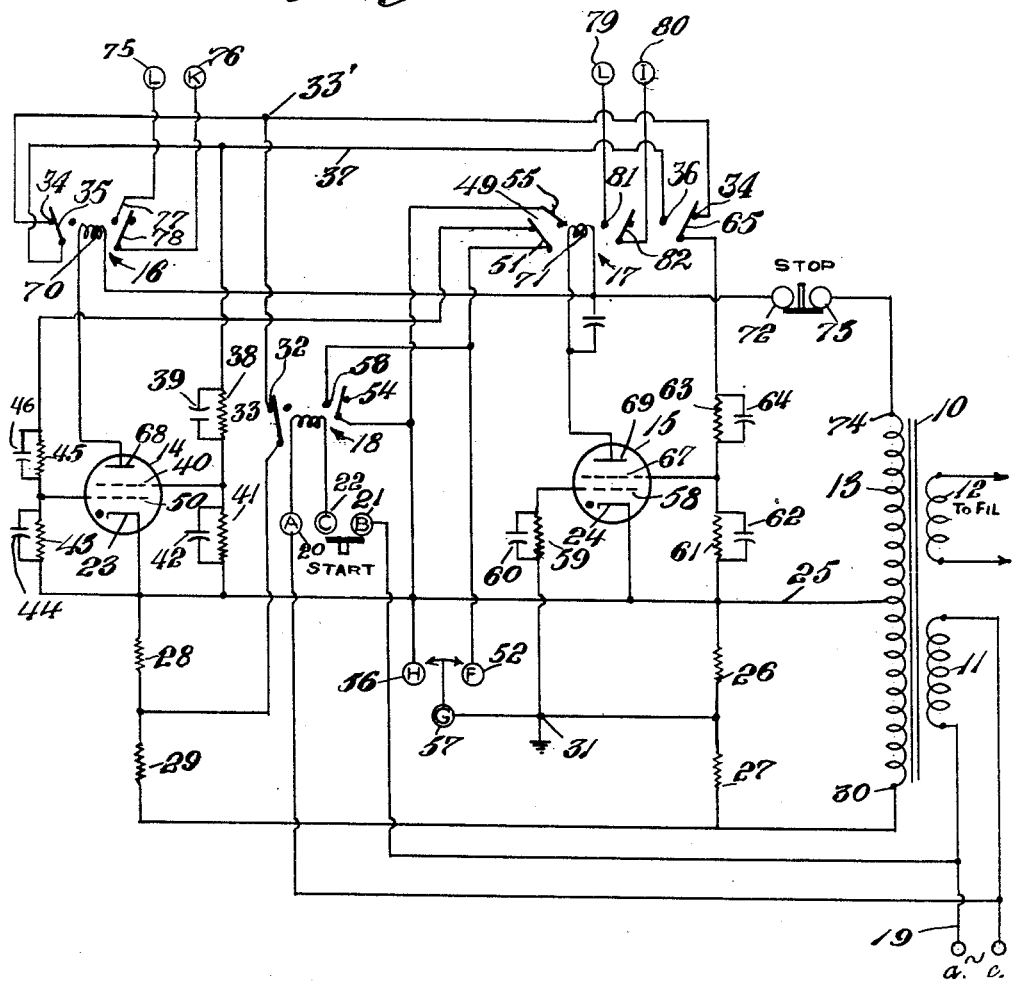

Patented June 19, 1951

2,557,675

UNITED STATES PATENT OFFICE 2,557,675

ELECTRICAL CONTROL CIRCUIT

Raymond H. Miller, Riverside, R. I., assignor to Federal Products Corporation, a corporation of Rhode Island Application May 12, 1947, Serial No. 747,502

14 Claims. (Cl. 175—320)

This invention relates to an electrical circuit for controlling the operation of some machine or mechanical device and particularly for controlling some mechanisms which may be responsive to the operation of a gauge.

In the case of operation of the gauge in connection with the cutting or production of certain work, such for instance as grinding, it is desirable that the feed of the grinding wheel toward the work may be rapid up to a point close to the finished size, and then from that point to the finished size, the feeding of the wheel will be slower and when the work has been brought to the desired size that then feeding of the wheel will stop and will return to its initial position at the time of starting.

Further, in such operations, vibrations, which may cause a movement of the gauging pointer, must not effect a reversal of the operation once a change has been made. While such results may be accomplished by mechanical means, usually such mechanical means are clumsy, very intricate and must be of a high excellence of precision and thus costly to produce.

One of the objects of this invention is to provide a circuit which may be applied to control machines or apparatus in their various desired functions by the use of a relatively small and relatively inexpensive control unit.

Another of the objects of this invention is to provide an electrical circuit which is powered from a source of alternating current and which will satisfactorily operate to control a machine or apparatus in response to the movement of the pointer of a dial indicator.

Another object of this invention is to provide an electrical circuit which is so arranged that after the pointer has reached one value at which the same is set, the electrical circuit will prevent a reversal or a return to the condition just prior to the point of reaching this location and, thus, no return to the condition previously existing can occur even though the pointer should, through vibration or other means, return to a point below that at which the change had caused a different result in the operation of the machine or apparatus.

Another object of this invention is to provide a control for a machine or apparatus which will be more accurate than can be performed where the human element of the operator is relied upon to actuate, stop or change the operation of the machine in response to his observation of a certain machine.

With these and other objects in view, the invention consists of certain novel features of construction as will be more fully described and particularly pointed out in the appended claims.

In the accompanying drawings where like reference numerals refer to similar parts:

Fig. 1 illustrates diagrammatically an electrical circuit which is utilized to perform this result.

Figs. 2 and 3 are diagrammatic views illustrating single control circuits of the alternating current type where only a single control is necessary.

The electrical circuit which I have provided is adapted for use in such action as occurs in a cylindrical grinding machine where plunge grinding is performed, and it is desired that the feed of the grinding wheel may advance rapidly at first to within a few thousandths of the finished size desired and to then advance slowly to the finished size; and when this finished size is reached, the grinding wheel will reverse and move away from the work; and even though a bump or raised point on the work occurs or there is vibration so that the pointer would return to a point out of the regular progression of movement from one side to the other, this would not cause a reversal of the feeding sequence as above outlined; and, thus, once the pointer has reached the point of slow grind, this slow grind would then continue until finished size was reached or once the pointer caused a reversal of the feed this feed would then continue in reverse until a new cycle was again started manually.

Referring to Fig. 1 of the invention, the electric circuit consists of transformer 10 having a primary winding 11 and two secondary windings 12 and 13, two Thyratron type tubes 14 and 15, two three-pole, double-throw control relays 16 and 17 and a two-pole, double-throw starting relay 18.

A source of alternating current power is applied to terminals 19 energizing primary 11 and supplying voltage to terminals 20 and 21 of starting relay contacts. Secondary winding 12 provides heating current to the filaments, which for simplicity are not illustrated, of the Thyratron type tubes 14 and 15, and secondary winding 13 supplies plate voltage to said tubes. The center tap of transformer secondary 13 is connected to cathodes 23 and 24 of tubes 14 and 15 through lead 25. A voltage divider network comprising serially-connected resistors 26 and 27 and a second voltage divider network comprising serially-connected resistors 28 and 29 are connected in parallel between terminal 30 of secondary winding 13 and the center tap of said secondary winding. The juncture of resistances 26 and 27 is connected to an electrical tie-point at 31, and the juncture of resistances 28 and 29 is connected through normally closed contact 32 and armature 33 of starting relay 18 and in one branch from tie-point 33' to normally closed contact 34 and armature 35 of relay 16, while in another branch it is connected from tie-point 33' to normally closed contact 34' and armature 65 of relay 17. Armature 35 of relay 16 is connected through lead 37 to contact 36 of relay 17 and through an isolating network consisting of parallelly connected resistance 38 and capacitance 39 to secondary grid 40 of Thyratron type tube 14. Armature 65 of relay 17 is connected through an isolating network consisting of parallelly connected resistance 63 and capacitance 64 to secondary grid 67 of Thyratron type tube 15. The voltage on grid 40 is prevented from "floating" by parallelly connected resistance 41 and capacitance 42 connected between screen grid 40 and cathode 23 of the tube 14. A network comprising resistance 43 and capacitance 44 in parallel, acting as a grid impedance and current limiter, is connected between cathode 23 and grid 50 of tube 14. An isolation network comprising resistance 45 and capacitance 46 in parallel is connected between grid 50 of tube 14 and contact 49 of relay 17. Armature 51 of relay 17 is normally connected to contact 49 of said relay and is also connected to control terminal 52 and contact 53 of relay 18. Control contact 56 is connected to center tap lead 25, armature 54 of relay 18, and contact 55 of relay 17. Control terminal 57 is connected to an electrical tie-point at 31. Grid 58 of tube 15 is connected through a grid impedance and current limiting network consisting of parallelly connected resistance 59 and capacitance 60 to electrical tie-point at 31. A network consisting of parallelly connected resistance 61 and capacitance 62, which prevents the grid from "floating," is connected between secondary grid 67 and cathode 24 of tube 15. An isolation network consisting of parallelly connected resistance 63 and capacitance 64 is connected between secondary grid 67 of tube 15 and armature 65 of relay 17.

The anodes 68 and 69 of the two Thyratron type tubes 14 and 15 are connected, respectively, to the coils 70 and 71 of the relays 16 and 17. These relay coils are, in turn, connected through stop-button contacts 72 and 73 to contact 74 of the secondary winding 13. First control circuit terminals 75 and 76 are connected, respectively, to normally open contact 77 and armature 78 of relay 16. Second control circuit terminals 79 and 80 are connected, respectively, to normally open contact 81 and armature 82 of relay 17.

In one particular embodiment of this invention, control terminals 52, 56 and 57 are connected to a measuring gauge head which is connected to terminal 57 and which has two stationary but adjustable contacts 52 and 56, respectively. If, while measuring, the pointer of the indicator moves far enough away from its central position, it will make contact with either terminal 52 or 56, thereby completing either one or the other control circuit. Thus, with such an arrangement, it will be seen that it is impossible to close both circuits simultaneously and neither tube will be controlled until the indicator pointer moves a predetermined distance away from its central position.

There are two complete control circuits in the embodiment of Fig. 1: one, through tube 14 and the relay 16; the other, through tube 15 and the relay 17 both completed by the transformer winding 13. When tube 15 fires, it energizes relay 17 and closes a circuit between terminals 79 and 80; and, when tube 14 fires, it energizes relay 16, thereby closing a second circuit between contacts 75 and 76.

It is well known in the art that Thyratron type tubes will fire only when their anodes have a positive voltage applied to them with respect to the cathodes, and since the secondary of transformer 10 applies to the anodes of the tubes, an alternating voltage I will consider only the half cycles when the anode voltage is positive, at which time the voltages for the grid control are negative. Since the voltage divider networks and the tube anodes are connected to opposite halves of the same transformer secondary winding, their respective voltages will be 180 electrical degrees out of phase; and if a sufficient voltage is applied from either divider network to a tube grid, that particular tube will be prevented from firing. To obtain grid control, the mid-point of the voltage divider network consisting of resistors 26 and 27 is connected to terminal 57 and also through resistance 59 and capacitance 60 to the control grid 58 of tube 15. The control grid 50 of tube 14 is connected through isolation network consisting of resistance 45 and capacitance 46 and through relay contacts 49 and 51 to terminal 52. Since the control grid 58 of tube 15 has a negative voltage applied to it by resistance 26, tube 15 can fire only when terminals 56 and 57 are connected together, thereby shorting resistance 26 and allowing the voltage on the control grid 58 of tube 15 to become zero with respect to the cathode. Tube 14 is normally conductive since no bias voltage is applied to the grid 50. Therefore, tube 14 will fire continuously until terminals 57 and 52 are connected together, which will apply to the control grid 50 of tube 14 the bias voltage appearing across resistance 26, thereby stopping the tube. Thus, it will be seen that the tubes will start or stop each time the control contacts 52, 56 and 57 are operated. This is an undesirable condition. To assure that the operation is non-repetitive, the secondary grid of each tube is connected to another voltage divider consisting of resistances 28 and 29 through a pair of normally closed contacts 32 and 33 of relay 18 and then respectively through normally closed contacts 34 and 35 of relay 16 and contacts 65 and 36 of relay 17. Thus, the voltage appearing across resistance 28, when applied to the secondary grid of either tube, will prevent that tube from firing regardless of the voltage appearing on the control grids.

A gauging cycle is begun by pressing the start button, thereby energizing the armature of relay 18 through contacts 21 and 22 and removing the blocking voltage developed across resistance 28 from the secondary grids of both tubes by the opening of contact 32. Therefore, if the control grid of either tube allows that tube to fire, the tube's associated relay will be energized which will break the blocking voltage circuit to the secondary grid of that tube. Relay 18 will be de-energized when start button is released, but the blocking voltage will not be applied to the secondary grid of a tube that is firing. If the bias on a control grid of a tube that is firing is increased or the stop button is pressed, which will break the anode circuit to the tube, the tube will cease to fire and that tube's associated relay will be released and the blocking voltage will be applied to this secondary grid as in the initial condition and the tubes will be prevented from firing again until the start button is pressed.

In the use of the above circuit, I have found that I control plunge cuts during cylindrical grinding to a much closer degree than where either the mechanical device is utilized or where the element of manual control enters to affect the operation of a machine.

Referring to Figs. 2 and 3, the single electric gauge circuit consists of transformer 10' having a primary winding 11' and secondary winding 13', a Thyratron type tube 15' and a two-pole, single-throw control relay 117.

A source of alternating current power is applied to terminals 19' energizing secondary winding 13' to provide plate voltage to said tube 15'. The center tap of transformer secondary 13' is connected to cathode 24' through lead 25'. A voltage divider network comprising serially-connected resistors 26' and 27' and a second voltage divider network comprising serially-connected resistors 28' and 29' are connected in parallel between terminal 30' of secondary winding 13' and the center tap of said secondary winding. The juncture point of resistances 28' and 29' is connected through normally closed contacts 32' and 33' of the start button to normally closed contact 118 and armature 119 of relay 117. Armature 119 of relay 117 is connected through isolating network 120 consisting of parallelly connected resistance 121 and capacitance 122 to secondary grid 67' of Thyratron type tube 15'. The voltage on grid 67' is prevented from "floating" by parallel connected resistance 123 and capacitance 124 connected between screen grid 68' and cathode 24' of tube 15'. Anode 69' is connected through the coil 125 of relay 117, stop-button contacts 72' and 73' to contact 74' of secondary winding 13'. Control circuit terminals 126 and 127 are connected to normally open contact 128 and armature 129 of relay 117.

In Fig. 2, the grid 58' of tube 15' is connected through a grid impedance and current limiting network consisting of parallelly connected resistance 130 and capacitance 131 to electrical tie-point 31' and a juncture of resistances 26' and 27'. Control terminal contact 132 is connected to electrical tie-point 31' and control terminal 133 is connected to the center tap of transformer secondary 13'.

In Fig. 3, the juncture of resistances 26' and 27' is connected through control terminals 134 and 135 and an isolation network comprising parallelly connected resistance 136 and capacitance 137 to grid 58' of tube 15'. A network comprising parallelly connected resistance 138 and capacitance 139, acting as a grid impedance and current limiter, is connected between cathode 24' and grid 58' of tube 15'.

It will be noted that Figs. 2 and 3 are similar in structure, the distinguishing feature being found in the grid control circuit. The firing of the tube in Fig. 2 is predicated on the fact that the control contacts 132 and 133 will close thereby effectively shorting the output from the voltage divider, while in Fig. 3 the tube will fire upon the opening of the control contacts 134 and 135 which opens the circuit to the grid of the tube. In both circuits the grid voltage is raised to the cathode potential which insures firing of the tube.

The grid control circuits in these control devices, as in Fig. 1, operate in the same novel manner. In order for the control tubes to fire the anode voltage must be positive with respect to the cathode voltage and the voltages on the grids must also be at cathode potential. The voltages applied to the grids, it will be noted, are supplied from the opposite half of the secondary winding of the transformer from the anode-cathode potential. This means that at any instant of time the voltages supplied will be 180 electrical degrees out of phase and of opposite polarity. Such a condition will prevent firing of the tubes. Since the voltages applied to the two grids are from separate voltage divider networks, the raising of the voltage of one grid to that of the cathode will not initiate firing unless the voltage on the other grid is also raised to cathode potential. This feature gives rise to the novel non-repetitive feature of the invention.

Taking for example the operation of Fig. 2, the tube will fire when contacts 132 and 133 are closed, provided there is no control voltage on the secondary grid 67'. Assume that a control cycle is to be initiated and the contacts 132 and 133 are closed. The "Start" button is pressed, thereby opening contacts 32' and 33' and removing the control voltage from secondary grid 67'. Since the output from the control grid voltage divider is shorted and this grid is at cathode potential, the tube will fire. This causes a flow of current through the tube relay coil 125, the upper half 13' of the transformer completing the circuit. The flow of current through the relay coil will attract relay armatures 119 and 129, opening the circuit to the secondary grid 67', in the first instance, and closing the external control circuit, in the second instance. The "Start" button is of the momentarily open-circuit type and will have returned to its initial closed position but there will not be any voltage applied to the secondary grid due to the operation of relay armature 119. The tube will now continue to fire until the "Stop" button is pressed which will open the anode-cathode circuit or until the control circuit contacts 132, 133 are opened which will apply control grid bias to the tube.

Once the tube has ceased to fire, the relay armatures will return to their normal positions, reclosing the secondary grid circuit in the first instance, and opening the external control circuit in the second instance. Once the secondary grid circuit is closed the tube will never refire until the "Start" button is pressed, regardless of the voltage on the control grid. This is the non-repetitive feature.

The operation of the circuit of Fig. 3 is the same in operation as the circuit of Fig. 2 except that the initial firing of the tube is predicated on the fact that the contacts 134, 135 will be open. It will be noted that in Fig. 2 the control contacts were closed. The opening of the contacts in Fig. 3 will also raise the voltage on the control grid to the cathode potential, as there is a current limiting and grid impedance network 138, 139 in the control grid—cathode circuit.

From the above, it will be apparent that I may have a tube fire either when the circuit is closed or when the circuit is opened and thus the circuit will be very flexible as to the mechanical arrangement in the gauge which it is used to actuate the circuit.

I claim:

1. A control circuit comprising a gaseous discharge tube having an anode, a cathode and at least one grid, a source of alternating current electrical energy having two terminals, a common reference potential which is the electrical neutral of said source, two voltage divider networks connected between said common reference potential and one terminal of said source, the anode of said tube being connected to the other terminal of said source, the cathode of said tube being connected to the common reference potential, a first means connecting the output of one of said voltage dividers to a grid of said tube to apply a bias, said means including a switch to remove the bias from said grid permitting the tube to fire, a second means connecting the output of the other voltage divider to a grid of said tube to apply a control voltage, said second means responsive to the firing of said tube to apply a blocking voltage to a grid of said tube, said second means maintaining the blocking voltage irrespective of the voltage on the grid caused by the first means to prevent refiring after said first means applies said bias to interrupt the initial firing of said tube.

2. A control circuit comprising a gaseous discharge tube having an anode, a cathode, a control grid, and a secondary grid, a source of alternating current having two terminals, a common reference potential which is the electrical neutral of said source, two voltage divider networks connected between said common reference potential and one terminal of said source, the anode of said tube being connected to the other terminal of said source, the cathode of said tube being connected to the common reference potential, a first means connecting the output of one of said voltage dividers to the control grid of said tube to apply a bias, said means including a switch to remove the bias from the control grid permitting the tube to fire, a second means connecting the output of the other voltage divider to the secondary grid of said tube applying a control voltage, said second means responsive to the firing of said tube to apply a blocking voltage to the secondary grid of said tube, said second means maintaining the blocking voltage irrespective of the voltage on the control grid to prevent refiring after said first means applies said bias to interrupt the initial firing of said tube.

3. A control circuit comprising a gaseous discharge tube having an anode, a cathode, a control grid, and a secondary grid, a source of alternating current, a transformer having a primary winding connected to said source and a secondary winding having a center tap, two voltage divider networks connected between one end and the center tap of said secondary winding, the anode being connected to the other end of said secondary winding, the cathode being connected to the center tap of said secondary winding, a first means connecting the output of one of said voltage dividers to the control grid of said tube to apply a bias, said means including a switch to remove the bias from the control grid permitting the tube to fire, a second means connecting the output of the other voltage divider to the secondary grid of said tube applying a control voltage, said second means responsive to the firing of said tube to apply a blocking voltage to the secondary grid of said tube, said second means maintaining the blocking voltage irrespective of the voltage on the control grid to prevent refiring after said first means applies said bias to interrupt the initial firing of said tube.

4. A control device including a gaseous discharge tube having an anode, a cathode, control grid, and secondary grid, a transformer having a center tap secondary, first and second voltage divider networks connected between the center tap and one end of said secondary, a relay armature winding connected between the other end of said secondary and the anode of said tube, a first means responsive to mechanical measurements connecting the output of said first divider to the control grid of said tube thereby controlling the conductivity of said tube, a second means connecting the output of said second voltage divider to the secondary grid of said tube for initiating conductivity of said tube, a third means included in said secondary grid circuit responsive to the absence of conduction of said tube to apply a blocking potential to said tube, thereby preventing recycling, and a fourth means responsive to said conductivity actuating an external control circuit.

5. In an electrical control circuit, two gaseous discharge tubes each having anode, cathode and at least one grid, a transformer having a secondary winding with a center tap, two relays each having a coil and an armature, two voltage divider networks, the anode of one of said tubes being connected through the coil of one of said relays to one side of said transformer secondary winding, said relay controlling a first external circuit, and the anode of the other of said tubes being connected through the coil of the second of said relays to the same side of said transformer secondary winding, said second relay controlling a second external circuit, the cathodes of said tubes being connected to said center tap, said voltage divider networks connected between said center tap and the other end of said transformer secondary winding, the output of one of said voltage divider networks being connected to the grid of one of said tubes, and the output of the other of said voltage divider networks being connected to the grid of the other of said tubes whereby said tubes are normally maintained non-conductive.

6. An electrical control circuit as in claim 5 wherein means for shorting one of said voltage dividers is provided whereby one of said tubes is made conductive, thereby energizing one of said relays and moving said armature to actuate an external control circuit.

7. In a system for controlling two external circuits, a source of alternating current energy, a transformer having a center tapped secondary, two Thyratron type discharge tubes having a plurality of electrodes, two voltage divider networks for producing biasing potentials, means connecting the output of the first of said networks to a primary control electrode of one of said discharge devices so that said tube may be non-conductive, means for shorting the output of the first of said networks to make said tube conductive, means connecting the output of the second of said networks to a secondary control electrode of each of said tubes, means for normally applying the output of said second network to the other of said discharge devices whereby said device is maintained non-conductive, means for applying the output of said second network to a secondary control electrode of the first discharge device whereby operation of the circuit is non-repetitive, means for interrupting the voltage output of said second network momentarily to initiate operation of the circuit whereby said second discharge device conducts, and means for applying the output of said first network to the primary control electrode of said second discharge device to stop conduction of said discharge device.

8. In combination, a control circuit, a pair of electric circuits each comprising a gaseous discharge device of the controlled type having a plurality of control grids for controlling the conductivity of said gaseous discharge devices, an anode and cathode, and a relay for controlling an external circuit, a source of alternating voltage, means for impressing a periodic anode voltage from said source on the anodes of said discharge devices, means for further impressing from said source a second periodic voltage on the control grids of said discharge devices, said second periodic voltage having substantially 180 electrical degrees phase displacement from the anode voltage, said relay connected in the anode circuit, and means for interrupting one of said control grid voltages permitting one discharge device to conduct, thereby completing an electrical circuit through said discharge device and relay to operate an external circuit.

9. A control circuit comprising a gaseous discharge tube having an anode, cathode and at least one grid, a transformer having a secondary winding with a center tap, a voltage divider network, the cathode of said tube being connected to the center tap of said winding, the anode of said tube being connected to one end of said winding, the voltage divider network connected between the other end and the center tap of said winding, means connecting the output of said voltage divider to said grid, whereby said tube will be normally non-conductive, the plate and grid voltages being substantially 180 electrical degrees out of phase, and means for shorting the output of said voltage divider to permit the tube to conduct.

10. A control circuit comprising gaseous discharge tubes each having an anode, cathode and at least one grid, a transformer having a secondary winding with a center tap, a plurality of voltage divider networks having output taps, the cathodes of said tubes being connected to the center tap of said winding, the anodes of said tubes being connected to one end of said winding, the voltage divider networks connected between the other end and the center tap of said winding, means connecting the output taps of each voltage divider to a grid, whereby said tubes will be normally non-conductive, the plate and grid voltages being substantially 180 electrical degrees out of phase and means to control the output of the voltage dividers to each grid to effectively reduce the bias and permit the tubes to conduct.

11. A control circuit comprising two gaseous discharge tubes each having anode, cathode, and a plurality of grids, a transformer having a secondary with a center tap, the cathodes of said tubes being connected to the center tap of said transformer and the anodes of said tubes being connected to one end of said secondary, a plurality of voltage divider networks having output taps connected between the center tap and the other end of the secondary of said transformer each grid of each tube being connected to an output tap of a voltage divider network, whereby said tubes will be normally non-conductive, the plate and grid voltages being substantially 180 electrical degrees out of phase, the output of each voltage divider network being connected to a different grid of said tubes, and means for controlling the output of a divider network to effectively reduce the grid bias and permit one tube to conduct.

12. A control circuit comprising two gaseous discharge tubes each having anode, cathode and at least one grid, a transformer having a secondary with a center tap, the cathodes of said tubes being connected to the center tap of said transformer, the anodes being connected to one end of the secondary of said transformer, a voltage divider network having an output tap connected between the center tap and other end of the secondary of said transformer, means connecting the output tap of said voltage divider network to the grid of each tube whereby said tubes are maintained non-conductive, and means for controlling the output from the divider network to the grid of one tube to permit said tube to conduct.

13. A control circuit as in claim 12 wherein said gaseous discharge tubes include a plurality of grids, the output tap of each voltage divider network being connected to a different grid of said tubes.

14. A control circuit comprising a gaseous discharge tube having an anode, cathode, and at least one grid, a transformer having a secondary winding with a center tap, means connecting the anode of said tube to one end of said secondary winding, two voltage divider networks having output taps connected between the other end of the secondary and the center tap, means connecting the output tap of the first of said voltage divider networks to a grid of said tube and means connecting the output tap of said second voltage divider network to another grid of said tube and means responsive to anode current for applying the output of said second voltage divider to the other grid.

RAYMOND H. MILLER.

REFERENCES CITED

The following references are of record in the file of this patent:

UNITED STATES PATENTS

| Number | Name | Date |
| --- | --- | --- |
| 2,404,643 | Livingston | July 23, 1946 |